United States Patent
Legner

(10) Patent No.: US 9,156,463 B2
(45) Date of Patent: Oct. 13, 2015

(54) VEHICLE AND METHOD FOR OPERATING A VEHICLE

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/114,980

(22) PCT Filed: Mar. 13, 2012

(86) PCT No.: PCT/EP2012/054339
§ 371 (c)(1),
(2), (4) Date: Oct. 31, 2013

(87) PCT Pub. No.: WO2012/156113
PCT Pub. Date: Nov. 22, 2012

(65) Prior Publication Data
US 2014/0080667 A1 Mar. 20, 2014

(30) Foreign Application Priority Data

May 18, 2011 (DE) .......................... 10 2011 076 034

(51) Int. Cl.
*B60T 7/12* (2006.01)
*F16H 61/40* (2010.01)
(Continued)

(52) U.S. Cl.
CPC .............. *B60W 10/196* (2013.01); *B60T 7/085* (2013.01); *B60T 7/12* (2013.01); *B60T 13/662* (2013.01);
(Continued)

(58) Field of Classification Search
CPC ...... F16H 39/00; F16H 59/08; B60W 10/103; B60W 10/188

USPC ........... 475/23–24, 72, 83, 116, 118; 477/38, 477/40, 52, 59, 60, 68, 94, 187
See application file for complete search history.

(56) References Cited

U.S. PATENT DOCUMENTS 3,437,184 A * 4/1969 Wilson .......................... 192/218
3,831,721 A * 8/1974 Shore ............................ 192/219
(Continued)

FOREIGN PATENT DOCUMENTS

DE          10241951          3/2004
GB          2469853           11/2010

OTHER PUBLICATIONS

PCT International Preliminary Report on Patentability, Jul. 9, 2012.
(Continued)

*Primary Examiner* — Robert Hodge
*Assistant Examiner* — Tinh Dang
(74) *Attorney, Agent, or Firm* — Dority & Manning, P.A.

(57) ABSTRACT

A vehicle has a drive train comprising a drive unit, a hydrostatic-mechanical power-split gear unit operatively connected to the drive unit and an output, and at least one braking device. An additional actuating device is allocated to the braking device and is operatively connected with a power request element and/or a driving direction selection element. Upon the presence of a deceleration of the vehicle requested by the driver through the power request element and/or the driving direction selection element and, the braking device is actuated to an extent that initiates a braking torque in the drive train. Upon the presence of a requested deceleration of the vehicle, a driving torque on the side of the drive unit is provided in the area of the output for a braking device that is not actuated by the driver. If the rotational speed of the drive unit exceeds a defined threshold of rotational speed, the braking device is operated to an extent that initiates a braking torque in the drive train.

11 Claims, 1 Drawing Sheet

(51) Int. Cl.
*B60W 10/00* (2006.01)
*B60W 10/196* (2012.01)
*B60T 7/08* (2006.01)
*B60T 13/66* (2006.01)
*B60W 10/103* (2012.01)
*B60W 10/188* (2012.01)
*B60W 30/18* (2012.01)
*B60W 10/04* (2006.01)
*B60W 10/11* (2012.01)
*F16H 59/08* (2006.01)

(52) U.S. Cl.
CPC .............. *B60W 10/04* (2013.01); *B60W 10/103* (2013.01); *B60W 10/11* (2013.01); *B60W 10/188* (2013.01); *B60W 30/18045* (2013.01); *B60W 30/18072* (2013.01); *B60W 30/18136* (2013.01); *B60W 2510/0638* (2013.01); *B60W 2540/10* (2013.01); *B60W 2540/12* (2013.01); *B60W 2540/16* (2013.01); *B60Y 2200/415* (2013.01); *F16H 2059/088* (2013.01); *Y10T 477/644* (2015.01)

(56) References Cited

U.S. PATENT DOCUMENTS

| | | | |
|---|---|---|---|
| 3,910,389 A | 10/1975 | Pleier | |
| 4,248,330 A | 2/1981 | Audiffred, Jr. et al. | |
| 4,376,474 A * | 3/1983 | Tunnell et al. | 192/219.4 |
| 5,683,322 A * | 11/1997 | Meyerle | 475/72 |
| 6,413,189 B1 * | 7/2002 | Spiess et al. | 477/110 |
| 6,723,023 B2 * | 4/2004 | Murakami | 477/210 |
| 6,910,988 B2 * | 6/2005 | Carlsson | 477/92 |
| 7,771,314 B2 * | 8/2010 | Eguchi et al. | 477/110 |
| 7,959,538 B2 * | 6/2011 | Hatanaka | 477/187 |
| 2004/0166989 A1 | 8/2004 | Carlsson | |
| 2005/0071068 A1 * | 3/2005 | Funato et al. | 701/54 |
| 2007/0130938 A1 * | 6/2007 | Burgart et al. | 60/487 |
| 2009/0029826 A1 | 1/2009 | Eguchi et al. | |
| 2009/0133951 A1 * | 5/2009 | Schultz et al. | 180/307 |

OTHER PUBLICATIONS

PCT International Search Report, Jul. 9, 2012.
German Patent Office Search Report, Oct. 20, 2011.

* cited by examiner

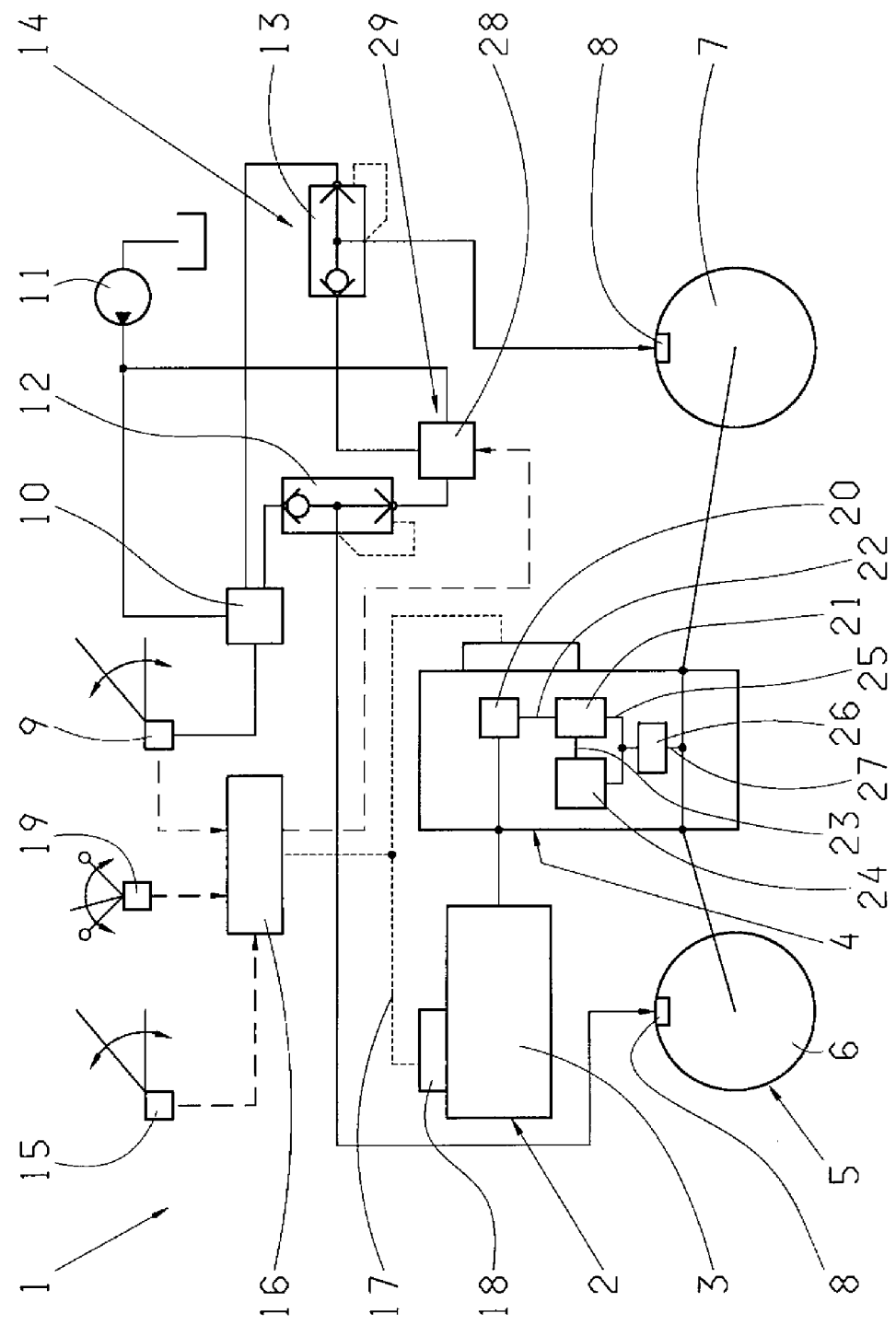

VEHICLE AND METHOD FOR OPERATING A VEHICLE

FIELD OF THE INVENTION

The invention relates to a vehicle of a type with a drive train comprising a drive unit, a hydrostatic-mechanical power-split gear unit that is operatively connected with it and an output, and with at least one braking device, by means of which, upon a corresponding actuation by the driver of a brake actuation element, a braking torque is able to be initiated in the drive train. A driving torque of the drive unit is variable depending on an actuation by the driver of a power request element and a driving direction selection element. The invention also relates to a method for operating such a vehicle.

BACKGROUND

DE 602 12 384 T2 discloses a method for operating a vehicle and/or a method for reversing the driving direction of a moving vehicle, for which a movement of a gear selection device is captured in a position that indicates a new intended driving direction. Such a method for reversing driving direction is often carried out during the operating of a wheel loader. When loading, a wheel loader alternately passes through short routes in the forward and reverse driving directions. Thereby, for example, the vehicle or wheel loader initially moves in the forward driving direction and, upon the presence of a request for a change in driving direction, brakes until it comes to a standstill, and is then operated in a reverse driving direction. Following this, the wheel loader is once again completely braked, and is then operated in the forward driving direction.

In order to avoid a motor of a vehicle being used for the braking of the vehicle when there is a change in driving direction requested by the driver, and the fuel consumption of the motor being increased to an undesired extent, the driving brakes of the vehicle, which are wheel brakes, are actuated depending on the degree of actuation by the driver of a gas pedal of the vehicle, after the gear selection device is transferred into a position equivalent to the new driving direction position. Thereby, it is intended that the extent of the actuation of the driving brakes increases with an increasing actuation of the gas pedal of the vehicle.

A drive train of a vehicle comprises an internal combustion engine in the form of, for example, a diesel engine, an automatic gearbox and/or a main gearbox, and a hydrodynamic torque converter arranged between the main gearbox and the internal combustion engine. The main gearbox is constructed with a forward/reverse gearbox, and a pump for the lift hydraulics of the vehicle is powered by an output shaft of an internal combustion engine. An output shaft of the main gearbox is connected with a differential gearbox of a wheel axle, on which the drive wheels of the vehicle are arranged. Each driving brake is provided in the area of the wheels, in a known manner.

Assuming an operating state of the vehicle, which may be constructed as a wheel loader, with an actual transmission ratio engaged in the main gearbox, is operated with a current vehicle speed in the forward driving direction, and upon a request by the driver for a change in driving direction from a forward to reverse driving direction and the simultaneous selection of a transmission ratio for reverse travel in the main gearbox, the gear selection device is adjusted by the driver into a position equivalent to this. The actuation of the gear selection device by the driver into a new position is recorded by a recording device, which is connected to a control unit.

Based on the movement of the gear selection device and/or the recording of the new position of the gear selection device, the main gearbox of the vehicle is decoupled from the internal combustion engine of the vehicle in the area of the forward/reverse gearbox, by which the motor power is now available in its entirety for the supply of hydraulic functions through the pump and other power consumption devices in the vehicle. Both the motor speed and the braking force provided by the driving brake are increased, while the drive speed is reduced at the same time.

In order to brake the vehicle when change in driving direction is requested, the gas pedal must be pressed by the driver, while at the same time the driving brake is not actuated. This leads to a controlled actuation of driving brakes of the vehicle. For this purpose, the position of the gas pedal is recorded by a second recording device. Thereby, the extent of the actuation of driving brakes is controlled as a function of the position of the gas pedal of the vehicle, whereas the deceleration of the vehicle is adjustable, in a linear or non-linear manner, to a desired extent.

However, it is disadvantageous that, based on the decoupling of the internal combustion engine from the main gearbox, thus from the output of the vehicle, the energy to be expended for the braking of the vehicle is not usable or recoverable for powering the hydraulic consumption devices connected with the internal combustion engine.

For vehicle drive trains without hydrodynamic torque converters constructed with hydrostatic-mechanical power-split gear units, when the driver requests a deceleration of a vehicle, for a simultaneous braking device that is not actuated by the driver, the power flow between a driving unit, such as a diesel engine or the like, and an output is not interrupted, and the drive unit is transferred in an overrun mode, in order to be able to apply a corresponding driving torque on the output. At the same time, the transmission ratio of the gear unit increases during the deceleration process of the vehicle, and the braking action of the drive unit increases, which does not consume any fuel in overrun mode. If, during such an operating state process of a vehicle drive train, an additional consumption device of a vehicle constructed with the vehicle drive train at the same time actuates working hydraulics, the thrust performance of the drive is able to be recovered directly in the vehicle hydraulics, as the power flow in the area of the gearbox between the output and the drive unit is permanently maintained during a deceleration process of the vehicle.

However, it is problematic with this approach that, upon a deceleration process of a vehicle with the starting point of a high speed of the vehicle, the braking action of the drive unit for the implementation of the requested deceleration of the vehicle is able to be realized only if a rotational speed of the drive unit, during the deceleration process of the vehicle, assumes values that adversely affect the functioning of the drive unit under certain circumstances.

SUMMARY OF THE INVENTION

Therefore, this invention is subject to the task of making available a vehicle and a method for operating a vehicle, by means of which any impairment of the functioning of a drive unit during a support of the deceleration of a vehicle on the side of the drive unit, is avoided. Additional objects and advantages of the invention will be set forth in part in the following description, or may be obvious from the description, or may be learned through practice of the invention.

In accordance with the invention, this task is solved with a vehicle and associated operating method with the characteristics of appended claims.

A vehicle under the invention is constructed with a drive train having a drive unit, a hydrostatic-mechanical power-split gear unit that is operatively connected with the drive unit, and an output, and with at least one braking device, by means of which, upon a corresponding actuation by the driver of a brake actuation element, a braking torque is able to be initiated in the drive train. A driving torque of the drive unit is variable depending on an actuation by the driver of a power request element and a driving direction selection element.

In accordance with the invention, an additional actuating device is allocated to the braking unit, which is operatively connected to the power request element and/or the driving direction selection element, and through which the braking device, upon a driver-requested deceleration of the vehicle through the power request element and/or the driving direction selection element and, in this case, in the power flow between the drive unit and the output, is able to be actuated to an extent that initiates a braking torque in the drive train.

Thus, there is a possibility of, in a simple manner, implementing a deceleration of a vehicle, preferably by the driver or by a driving program, for example during a change in driving direction or when the vehicle is traveling downhill, initially by means of an overrun mode of the drive unit, and, upon reaching impermissibly high rotational speeds of the drive unit, automatically supporting deceleration of the vehicle by corresponding actuation of the braking device through the additional actuating device, and thus avoiding any impairment in the functioning of the drive unit in a constructively easy manner.

With a constructively easy additional form of a vehicle under the invention, the braking device may be subjected to hydraulic pressure through a valve block that is able to be actuated by a brake actuation element for the representation of a braking torque.

If the power request element and/or the driving direction selection element and the brake actuation element are operatively connected through a control unit with a valve device formed as a proportional valve, through which the braking device may be subjected to hydraulic pressure for the representation of a braking torque, the braking device may be automatically actuated during a deceleration process of a vehicle with a low degree of steering and control effort and in a constructively easy manner, in order to avoid damage to the drive unit.

With one embodiment of the vehicle under the invention, which is likewise characterized by a low degree of actuation effort, a switch valve device is provided, through which the braking device may be subjected to hydraulic pressure either from the valve block or from the valve device.

Depending on the respective application in this case, the braking device comprises a driving brake of the vehicle with one or two independent braking circuits, and/or the braking device features a holding brake provided in a drive shaft train, through which, as appropriate for the need, the braking power required to avoid damages to the drive unit is able to be initiated in the drive train during a deceleration of the vehicle.

With the method under the invention for operating a vehicle with a drive train comprising a drive unit, a hydrostatic-mechanical power-split gear unit that is operatively connected with the drive unit, and an output, and with at least one braking device during a requested deceleration of a vehicle for a braking device that is not actuated by the driver, along with a power flow produced between the drive unit and the output, a driving torque on the side of the drive unit is provided in the area of the output.

In accordance with the invention, when a defined threshold of rotational speed of the drive unit is exceeded, the braking device is operated to an extent that initiates a braking torque in the drive train, in order to avoid any impairment in the functioning of the drive unit in an easy manner.

With an advantageous variation of the method under the invention, a transmission ratio of the gear unit is increased upon the presence of a specification for the deceleration of the vehicle desired by the driver, by which the driving torque made available through the drive unit is increased in a simple manner.

Both the characteristics specified in the claims and the characteristics specified in the subsequent embodiments of the invention are, by themselves alone or in any combination with one another, suitable for providing additional forms or embodiments of the invention. In terms of the additional embodiments of the invention, the particular combinations of characteristics do not represent a limitation; rather, they are essentially solely of an exemplary nature.

Additional advantages and advantageous embodiments of the object under the invention arise from the claims and the embodiment described below, with reference to the drawing in terms of principle.

BRIEF DESCRIPTION OF THE DRAWING

The sole FIGURE (FIG. 1) of the drawing shows a functional diagram of a vehicle.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 presents a functional diagram of a vehicle 1 with a drive train 2, which in this case comprises a drive unit 3 constructed as, for example, a diesel motor, a hydrostatic-mechanical power-split gear unit 4 that is operatively connected to the drive unit 3, an output 5, and/or a front axle 6 and a rear axle 7. The front axle 6 and the rear axle 7 are each allocated to a braking device 8, which in this case features a driving brake with two independent braking circuits.

The braking unit is able to be actuated by a driver through a brake actuation element 9 and/or a brake pedal, whereas, upon a corresponding actuation of the brake actuation element 9 by the driver through the braking device 8, a braking torque is able to be initiated in the drive train 2. For this purpose, the brake actuating element 9 is connected to a valve block 10, in the area of which hydraulic pressure made available by a pump device 11 of the hydraulic braking device 8 is forwarded in the direction of, in this case, a switch valve device 14 comprising two switch valves 12 and 13. Upon corresponding pressure bearing on the switch valve device 14 through the valve block 10, the hydraulic pressure is forwarded through the switch valves 12 and 13 in the direction of the braking device 8 arranged in the area of the front axle 6 and the rear axle 7 and, in a known manner, a corresponding braking torque in the drive train 2 is initiated in the area of the front axle 6 and the rear axle 7, and the vehicle correspondingly decelerates.

Furthermore, the vehicle 1 comprises a power request element 15 in the area of which the driver is able to transmit to a vehicle electronic system 16 a driver request specification and/or a request for a desired torque made available by the drive unit 3. For this purpose, the vehicle electronic system 16 is connected by electronic signal with a control unit 18 allocated to a drive unit 3 through a so-called CAN bus 17.

In addition, the vehicle 1 is constructed with a driving direction selection element 19 or a driving control, through which, in addition to a driving direction of the vehicle 1 in the forward driving direction or in the reverse driving direction, various transmission ratio areas and a so-called "neutral operating state" of the gear unit are able to be engaged in the gear unit 4. In the neutral state, power flow between the drive unit 3 and the output 5 is interrupted in the area of the gear unit 4.

A switch between a forward drive operating mode and a reverse drive operating mode of the vehicle 1 takes place through a so-called "reversing unit" 20, in the area of which a rotating direction of the drive unit 3 is convertible into a rotating direction in the area of the output 5 equivalent to a forward driving direction and a reverse driving direction. In this case, the reversing unit 20 is arranged in the power flow of the drive train 2 between the drive unit 3 and a planetary gear unit provided for the splitting of power, whereas the reversing unit is coupled with the planetary gear unit 21 in the area of a first shaft 22. In addition, the planetary gear unit 21 is operatively connected in the area of an additional shaft 23 with a hydraulic module 24 and, in the area of a third shaft 25, in turn both with the hydraulic module 24 and with a band switch 26. In the area of the band switch 26, in a known manner, through the actuation of various switching elements, various transmission ratio areas are, in turn, able to be engaged, within which each transmission ratio of gear unit 4 is continuously variable through the hydraulic module 24. The torque correspondingly converted in the area of the band switch 26 is forwarded through an output shaft 27 in the direction of the output 5.

If, for example, there is a request triggered by the driver for a deceleration of the vehicle 1, for example through a corresponding actuation of the driving direction selection element 19 for a change in driving direction of the vehicle 1, the vehicle 1 must be braked starting from the current vehicle speed until coming to a standstill, and then must in turn accelerate in the opposite driving direction depending on the actuation of the power request element 15, and must be operated at the requested speed. For this purpose, the power flow is maintained in the drive train 2 between the drive unit 3 and the output 5, and at the same time the drive unit 3 is transferred during the deceleration of the vehicle 1 until coming to a standstill in an overrun mode, in which, through the drive unit 3 at the output 5, an overrun mode decelerating the vehicle is able to be applied, whereas the drive unit 3 does not consume any fuel in the overrun mode. At the same time, the transmission ratio of the gear unit 4 increases, in order to be able to apply on the output 5 a driving torque on the part of the drive unit that is as high as possible.

If, in the area of the control unit 18, the rotational speed of the drive unit 3 is determined to be greater than a defined rotational speed threshold, upon a simultaneous braking device that is not actuated by the driver, the braking device 8 is actuated, in a manner described more specifically below, to an extent that initiates a braking torque in the drive train 2.

The power request element 15 and the driving direction selection element 19, along with the brake actuating element 9, are operatively connected through the vehicle electronic system 16 and the CAN bus 17 with an additional actuating device 29, which features a valve device 28 formed as a proportional valve, through which the braking device 8 may be subjected to hydraulic pressure for the application of a braking torque. This means that, upon the determination of a rotational speed of the drive unit 3 larger than the defined rotational speed threshold, the valve device 28 is actuated by the vehicle electronic system 16, and the hydraulic pressure bearing on the valve device 28 from the pump device 11 is forwarded to the switch valves 12 and 13. The hydraulic pressure of the pump device 11 then bearing on the switch valves 12 and 13 is in turn forwarded to the braking device 8 and produces a braking torque in the area of the front axle 6 and the rear axle 7, in order to decelerate the vehicle to the desired extent and at the same time unburden the drive unit 3 and reduce the rotational speed of the drive unit 2 to a permissible amount.

With the construction of the vehicle 1 with the valve block 10 as described above, with the valve block 10, the switch valve device 14, and the additional valve device 28, the braking action of the braking device 8 is able to be requested either by the driver through the brake actuation element 9 or automatically through the vehicle electronic system 16. The supply of pressure of the valve device 28 can take place either in the manner presented in the FIGURE directly from the pump device 11 or through the valve block 10 of the braking device 8.

With the vehicle under the invention, the drive unit of a drive train of a vehicle, during a deceleration of the vehicle in a simple manner, is protected from an excess rotational speed that irreversibly impairs the functioning of a drive unit, and at the same time a requested and/or desired deceleration of the vehicle is implemented. Thereby, the driver of the vehicle under the invention always has the option of increasing the automatically presented braking action by actuating the brake actuation element.

Depending on the respective application in this case, a simplified system with only one braking circuit for automatic brake support is also able to be used during a deceleration process of a vehicle, whereas there is the option of using either only the front axle brake or only the rear axle brake.

If a vehicle drive train is constructed with a holding brake, preferably constructed as a multi-disc brake, in the area of a drive shaft train, such a holding brake is automatically able to be actuated, in order to, during a requested deceleration process of the vehicle, initiate a braking torque in the drive train and protect the drive unit from excess rotational speeds. With such a drive train, an engagement in the operating state of a driving brake of a vehicle is not necessary, if sufficient braking action is available through this holding brake.

Modifications and variations can be made to the embodiments illustrated or described herein without departing from the scope and spirit of the invention as set forth in the appended claims.

The invention claimed is:

1. A vehicle with a drive train, the vehicle comprising:
a drive unit;
a hydrostatic-mechanical gear unit operatively connected to the drive unit;
a drive output connected to the gear unit;
a braking device, the braking device actuated by a driver of the vehicle via a brake actuation element to initiate a braking torque;
a driving direction selection element;
a power request element, wherein a driving torque of the drive unit varies as a function of actuation of the power request element and the drying direction selection element by the driver;
an additional actuating device operatively configured with the braking device and at least one of the power request element or the driving direction selection element;

wherein upon a deceleration of the vehicle requested by the driver via the power request element or the driving direction selection element, the additional actuating device automatically actuates the braking device to initiate a braking torque in the power flow between the drive unit and the output without actuation of the brake actuation element by the driver; and the brake actuation element and the additional actuating device configured in parallel with the braking device such that the driver can apply an additional braking torque via the brake actuation element in addition to the braking torque initiated by the additional actuating device.

2. The vehicle as in claim 1, wherein the braking device is actuated by hydraulic pressure through a valve block upon actuation of the brake actuation element.

3. The vehicle as in claim 2, wherein the power request element, the driving direction selection element, and the brake actuation element are operatively connected to the additional actuating device through a vehicle electronic control system, the additional actuating device comprising a proportional valve through which hydraulic pressure is directed to the braking device.

4. The vehicle as in claim 3, wherein the braking device further comprises a switch valve device operatively connected to the valve block and the proportional valve, wherein the switch valve device is supplied with hydraulic pressure from either or both of the valve block or the proportional valve.

5. The vehicle as in claim 1, wherein the braking device comprises a drive brake having a front axle braking circuit and a rear axle braking circuit.

6. The vehicle as in claim 1, wherein the braking device comprises a drive brake having a single axle braking circuit.

7. The vehicle as in claim 1, further comprising a holding brake operatively configured the drive train of the vehicle.

8. A method for operating a vehicle with a drive train, the drive train including a drive unit, a hydrostatic-mechanical gear unit connected to the drive unit and a drive output wherein a driving torque produced by the drive train is transmitted to the drive output, and a braking device that generates a braking torque in the drive train, the braking device actuated by a driver of the vehicle via a brake actuation element, the method comprising:

upon a requested deceleration of the vehicle by a driver of the vehicle, detecting a rotational speed of the drive unit;

comparing the detected rotational speed of the drive unit to a threshold rotational speed;

if the detected rotational speed of the drive unit exceeds the threshold rotational speed, automatically actuating the braking device via an additional brake actuating device configured in parallel with the brake actuation element without further driver action to initiate a braking torque in the drive train; and if necessary, the driver applying additional braking torque via actuation of the brake actuation element in parallel with the additional brake actuating device.

9. The method as in claim 8, further comprising shifting the gear unit to an increased transmission ratio upon detection of the requested deceleration of the vehicle.

10. The method as in claim 9, wherein the request for deceleration of the vehicle is triggered by the driver via a request for a change in driving direction of the vehicle.

11. The method as in claim 10, wherein the request for deceleration of the vehicle is triggered during downhill travel of the vehicle.

* * * * *